United States Patent [19]

Sims

[11] Patent Number: 5,605,361
[45] Date of Patent: Feb. 25, 1997

[54] REPLACEMENT NOZZLE FOR PRESSURE VESSELS AND METHOD OF A ATTACHING SAME

[75] Inventor: William Sims, Russellville, Ark.

[73] Assignee: Entergy Operations, Inc., Russellville, Ark.

[21] Appl. No.: 239,177

[22] Filed: May 6, 1994

[51] Int. Cl.⁶ .............................. G21C 13/00; F16L 41/14
[52] U.S. Cl. ........................ 285/206; 29/447; 376/204; 376/307; 376/260; 285/187; 285/15; 285/197; 285/211; 285/220
[58] Field of Search ..................... 29/402.01, 890.031, 29/402.07, 906, 447; 138/97; 376/204, 260, 307; 285/197, 381, 15, 192, 221, 219, 220, 211, 208, 206, 187, 212; 165/76

[56] References Cited

U.S. PATENT DOCUMENTS

| | | | |
|---|---|---|---|
| 1,658,525 | 2/1928 | Nousley | 285/220 |
| 1,817,850 | 8/1931 | Schwalback . | |
| 2,711,841 | 6/1955 | Schaefer et al. | 285/192 |
| 2,800,912 | 7/1957 | McCamish et al. | 285/220 |
| 2,837,134 | 6/1958 | Steer | 285/192 |
| 2,874,749 | 2/1959 | Brink | 285/192 |
| 2,935,341 | 5/1960 | Steinen | 285/192 |
| 3,114,414 | 12/1963 | Judd . | |
| 3,348,850 | 10/1967 | Scales | 285/192 |
| 3,746,308 | 7/1973 | Vatterott | 285/197 |
| 4,255,840 | 3/1981 | Loch et al. | 29/402.08 |
| 4,440,339 | 4/1984 | Tamai et al. | 228/119 |
| 4,480,841 | 11/1984 | Schukei et al. | 277/1 |
| 4,615,477 | 10/1986 | Spada et al. | 228/119 |
| 4,655,483 | 4/1987 | Margotta | 285/169 |
| 4,676,717 | 6/1987 | Willyard, Jr. et al. | 29/447 |
| 4,723,795 | 2/1988 | Shenoy | 285/353 |
| 4,826,217 | 5/1989 | Guerrero | 285/158 |
| 5,091,140 | 2/1992 | Dixon et al. | 376/260 |
| 5,094,801 | 3/1992 | Dixon et al. | 376/307 |

(List continued on next page.)

FOREIGN PATENT DOCUMENTS

| | | |
|---|---|---|
| 4236005A1 | 10/1992 | Germany . |
| 1682710 | 10/1991 | U.S.S.R. ................. 285/209 |

*Primary Examiner*—Eric K. Nicholson
*Attorney, Agent, or Firm*—Rosen, Dainow & Jacobs Limited Liability Partnership

[57] ABSTRACT

The invention disclosed herein provides nozzles for vessels such as a pressurizer vessel, reactor vessel or piping in a nuclear power facility, and methods for attaching and sealing the nozzles to the vessels without any welding at all, i.e., without using a structural or seal weld. The nozzles are clamped or bolted to the vessel or attached by an interference fit, and a mechanical seal is obtained using gasket material and/or contacting, preferably polished, metal surfaces. Some embodiments of clamping the nozzle to the vessel comprise tightening a nut on the threaded end of the nozzle projecting from the bore in the vessel against the vessel, and structure which prevents the nozzle from being withdrawn through the bore, thereby clamping the nozzle against the vessel. Another embodiment of clamping a nozzle to the vessel comprises a sleeve threaded in the bore and forcing an interfering portion of the nozzle body into engagement with the bore. In still another clamping embodiment, an exterior flange (attached to or engaged with the nozzle) is clamped to the vessel by bolts and interferring portions of the nozzle and the bore. Embodiments of bolting the nozzle to the vessel include threading the nozzle in the bore, and structure which prevents the nozzle from being withdrawn through the bore. The engaging structure may comprise an interior flange attached to the nozzle surrounding the bore on the interior of the vessel, or interfering portions of the nozzle and the bore. The nozzle may also be mechanically sealed with an O-ring arrangement. Attaching a nozzle with an interference fit may be accomplished by creating a temperature gradient between a larger OD nozzle and a smaller ID bore sufficient to enlarge the diameter of the bore, reduce the diameter of the nozzle, or both to allow the nozzle to be inserted into the bore and then reducing the temperature gradient The invention also provides a nozzle arrangement which is clamped to a large bore pipe.

56 Claims, 5 Drawing Sheets

U.S. PATENT DOCUMENTS

| | | | |
|---|---|---|---|
| 5,149,490 | 9/1992 | Brown et al. | 376/260 |
| 5,196,160 | 3/1993 | Porowski | 376/260 |
| 5,202,082 | 4/1993 | Brown et al. | 376/260 |
| 5,209,895 | 5/1993 | Wivagg | 376/260 |
| 5,271,048 | 12/1993 | Behnke et al. | 376/260 |
| 5,274,683 | 12/1993 | Broda et al. | 376/260 |
| 5,278,878 | 1/1994 | Porowski | 376/260 |
| 5,297,187 | 3/1994 | Sodergren et al. | |
| 5,323,428 | 6/1994 | Porter et al. | 376/204 |
| 5,367,768 | 11/1994 | Weems | 29/890.031 |
| 5,404,382 | 4/1995 | Russ et al. | 376/260 |

U.S. Patent Feb. 25, 1997 Sheet 1 of 5 5,605,361
FIG. 1
PRIOR ART
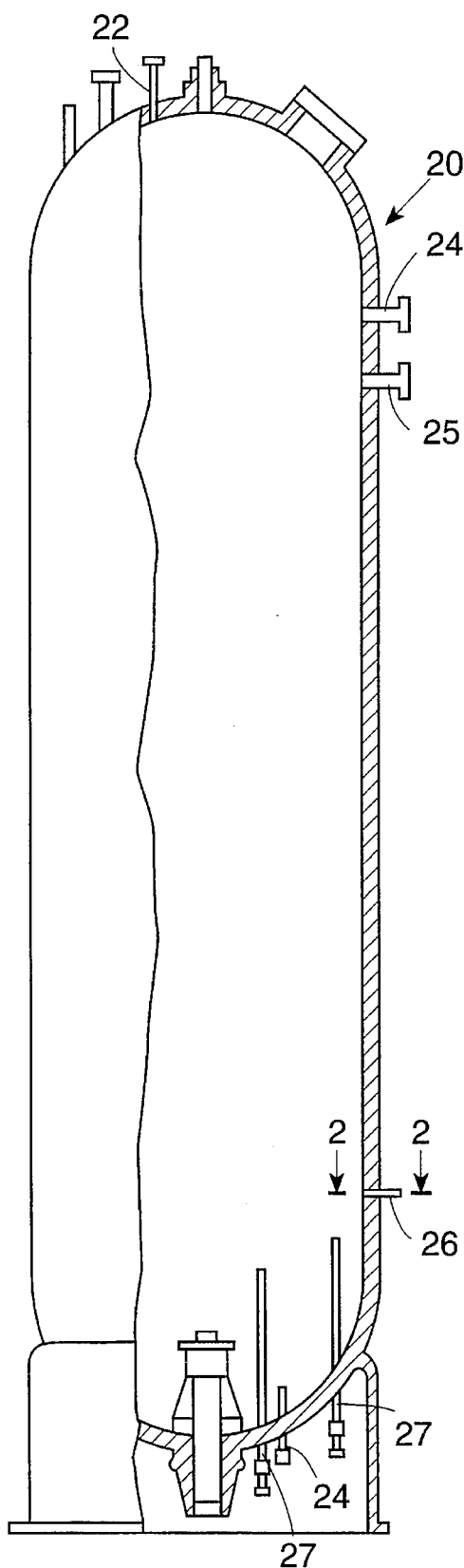
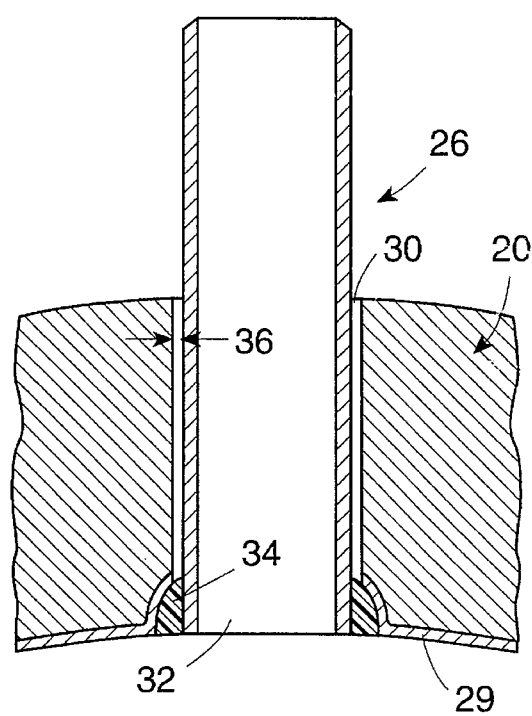
FIG. 2
PRIOR ART
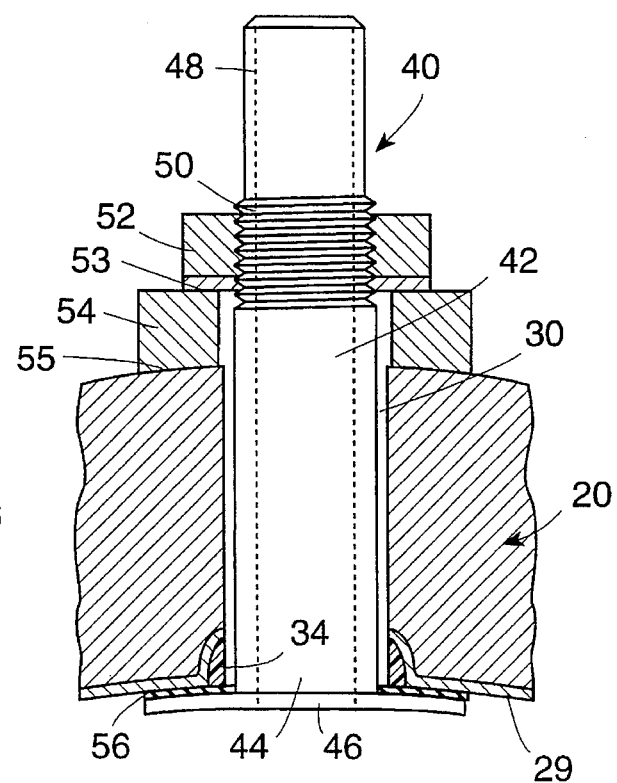
FIG. 3

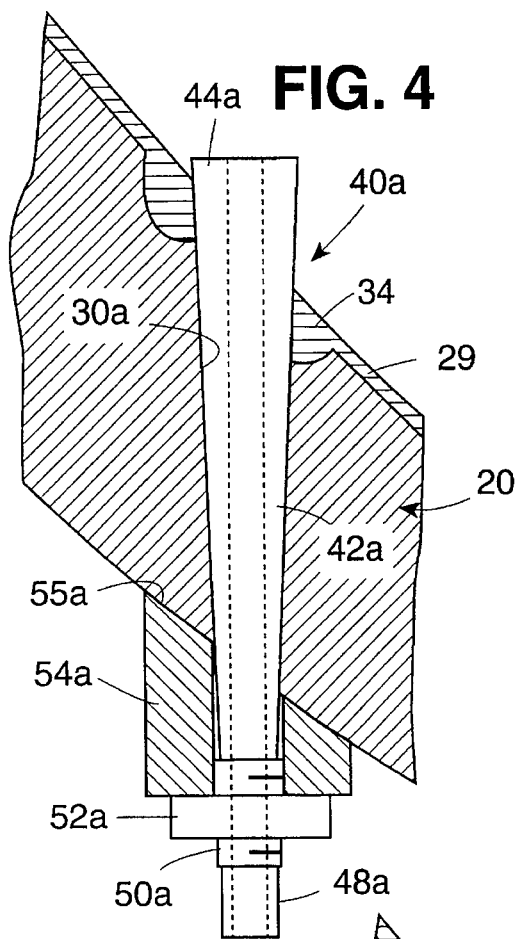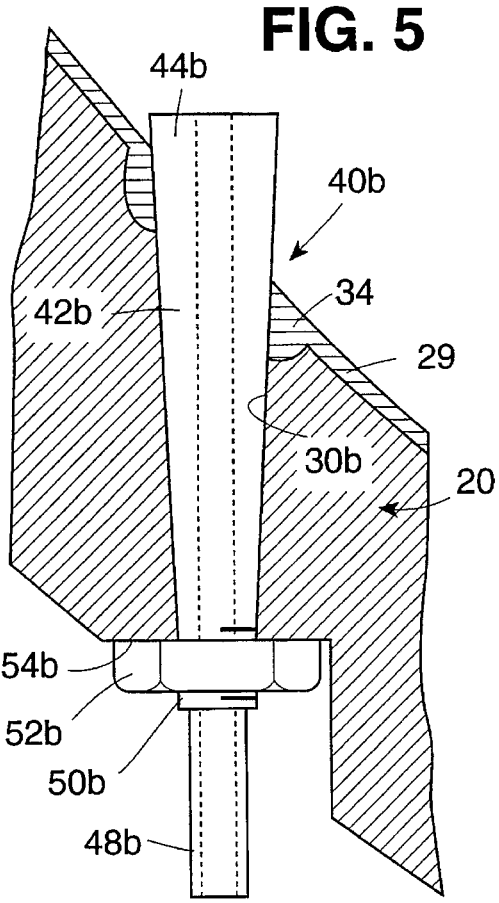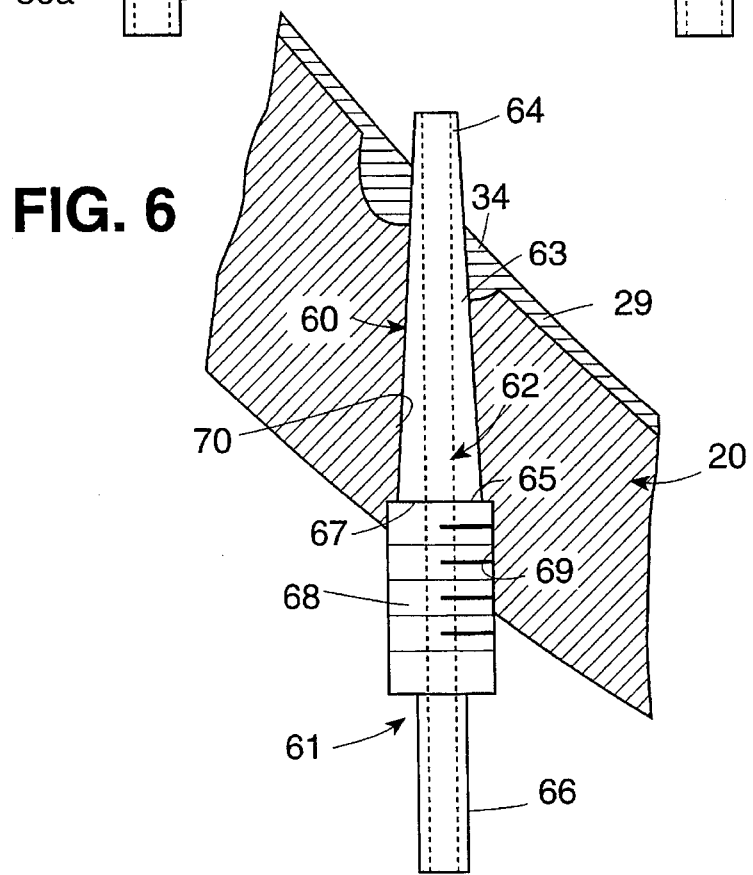

REPLACEMENT NOZZLE FOR PRESSURE VESSELS AND METHOD OF A ATTACHING SAME

BACKGROUND OF THE INVENTION

The invention disclosed herein relates to nozzles for vessels and piping that are installed either initially or as replacements without any welding, and to the installation of such nozzles without welding the nozzle to the vessel. (A "nozzle" may also be, or include as part thereof, a sleeve and/or piping. A "vessel" may also be large bore piping.) The invention more particularly relates to nozzles and procedures which replace nozzles that are attached to the vessel on the inside diameter of the vessel with a J groove structural weld, and has particular application to nozzles and procedures which replace or initially install nozzles in pressure vessels and large bore piping of pressurized water reactor nuclear power facilities which have failed due to phenomena known as Primary Water Stress Corrosion Cracking, PWSCC. The invention also particularly relates to nozzles and procedures for installing nozzles without welding as replacements or initial installations in large bore piping.

A typical nuclear power generating facility includes in part a reactor vessel, steam generator, pressurizer vessel, and a reactor coolant piping system, all of which operate under high pressure. Nozzles are attached to the vessels and/or piping for a number of purposes, e.g., for connecting piping and instrumentation, vents, and to secure control element drive mechanisms and heater elements. A typical pressurizer vessel 20 is shown in FIG. 1 with nozzles 22 for vents, nozzles 24 for liquid level, nozzles 25 for pressure sensing, a nozzle 26 for temperature measuring, and a number of nozzles 27 for heating elements. All of those nozzles were heretofore welded to the pressurizer vessel at the time of original manufacture.

As shown in FIG. 2, cladding 29 is welded to the interior of the pressurizer vessel which is made of carbon steel. The temperature nozzle 26 shown in cross section in FIG. 2, which is exemplary of the welded nozzles 22–27, passes through a hole or bore 30 in the pressurizer vessel 20 and is structurally welded at its interior end 32 to the vessel 20 with a J-weld 34 along the interior opening to the bore 30. The diameter of nozzle 32 is slightly less than the diameter of bore 30, so that there is a small annular space 36 between the nozzle exterior and the wall of bore 30. The J-weld 34 also functions as a seal weld to seal the annular space 36. A reactor vessel (not shown) similarly has nozzles represented by nozzle 26 in FIG. 2 welded thereto. The piping of the reactor coolant system (not shown) also includes similar nozzles welded thereto. Further details of pressurizer vessels, reactor vessels and coolant system piping, in particular, and nuclear power facilities, in general, are known to those of skill in the art.

As mentioned, the invention has particular application to the prevention of nozzle failures in nuclear power facilities due to PWSCC phenomena, which occurs on components having a susceptible material, high tensile stresses, and which are in a corrosive environment, conditions which primarily exist on nozzle penetrations in the pressurizer vessel, reactor coolant piping, and the reactor vessel. Such failures are manifested by cracking, which the applicant recognized resulted from high tensile stresses introduced by welds which structurally attach and/or seal the nozzle to the vessel and the corrosive effect of the coolant within the vessel. Such cracking occurs at the grain boundaries on the inside diameter of the nozzle material (Alloy 600) at or near the heat affected zone of the weld and propagates radially outward through the thickness of the nozzle which eventually leads to small leakage of the reactor coolant supply.

As indicated, nozzles of these types have failed over time and have had to be replaced, either because of a failure in the nozzle or the weld attaching and/or sealing the nozzle to the vessel. A typical replacement procedure in a nuclear power plant environment requires shutting down the nuclear power plant, removing the nozzle, which typically requires machining operations, and welding a replacement nozzle to the vessel or piping. The welded replacement nozzles currently in use closely duplicate the original welded nozzle they replace, except that they may be made of a different alloy, e.g., Alloy 690 (less susceptible to PWSCC) instead of Alloy 600, and may also be represented by the nozzle shown in FIG. 2. Other weld repair methods involve installing a thick weld pad on the outside of the vessel and structurally welding the nozzle to the pad, and seal welding the interior end of the nozzle to the vessel.

Replacements employing the above-described procedures in a nuclear power plant currently require a minimum of approximately fourteen days for some types of nozzles and are extremely expensive. Including the lost revenue resulting from plant shut-down, which may be as high as $750,000 per day, the total cost of each repair is millions of dollars.

The above-described nozzle replacement procedures and any other replacement procedure that requires welding the replacement nozzle to the vessel not only is time consuming and therefore expensive, but also exposes repair personnel to radiation hazards, particularly where the nozzle replacement method involves personnel entering inside the vessel to perform the replacement. Also, both the original welded nozzle and the welded replacement nozzle and method subject the nozzle to high residual stresses imposed by weld shrinkage. These high residual stresses increase the susceptibility to PWSCC. Thus, the welded replacement nozzle offers no improvement over the original nozzle in terms of expected life and reduction of failures, other than any improvement that may result from use of a superior nozzle material. Although, Alloy 690 material is less susceptible to PWSCC than Alloy 600, it is not known at this time whether the change in nozzle material alone will eliminate the possibility of nozzle failures. Furthermore, one utility that has replaced nozzles using the original design criteria and Alloy 690 material experienced failures in the weld material itself. Based on this information, an improved nozzle replacement method is needed.

U.S. Pat. Nos. 5,149,490 and 5,202,082 (both of Brown et al.) describe methods and apparatus for replacing a nozzle for a pressurizer vessel in which the replacement nozzle is threaded to the bore. Although the replacement nozzle of the '490 patent is mechanically attached to the pressurizer vessel, according to the '490 patent, welding is still required to provide the seal between the nozzle and the pressurizer vessel. Therefore, the residual stresses discussed above are imposed on the nozzle by the weld whether it be a structural weld or a seal weld.

In the replacement procedure and nozzle described in the '082 patent, the original welded nozzle is not fully removed, and a mechanical seal is made between the remaining cracked nozzle portion and the end of the replacement nozzle. Leaving part of the existing nozzle at the interior welded end of the nozzle may lead to a future failure because the existing failed portion of Alloy 600 nozzle which was not removed from the vessel has cracks near the existing J weld that may propagate out to the base material of the vessel and cause further cracking in the failed portion of the nozzle. Further cracking in the remaining portion of the failed nozzle would not likely result in reactor coolant leakage, and therefore might be justified for the life of the plant; however, a better design practice would be to remove the cracked nozzle to eliminate further degradation of the vessel. The procedure described in the '882 patent thus has the drawback that a portion of the failed nozzle remains structurally welded to the vessel and therefore continues to subject the vessel to the same stresses as the original nozzle. In any event, the remaining nozzle portion and the vessel portion surrounding the bore opening are subject to further degradation.

As far as the applicant is aware, the nozzles and replacement procedures disclosed in the '490 and '882 patents have not been used in a nuclear power facility.

The following U.S. patents disclose other procedures for replacing or repairing nozzles, sleeves or tubes which include welding: 4,255,840 (Loch et al.); 4,440,339 (Tamai et al.); 4,615,477 (Spada et al.); 5,091,140 (Dixon et al.); 5,094,801 (Dixon et al.); 5,196,160 (Porowski); 5,209,895 (Wivagg); 5,271,048 (Behake et al.); and 5,274,683 (Broda et al.). U.S. Pat. No. 4,826,217 (Guerrero) discloses a mechanical tube clamp for boiling water reactors. U.S. Pat. No. 5,278,878 (Porowski) discloses a method for reducing tensile stresses in the welded nozzles.

Also a method previously used in steam generator tube repairs has been proposed with certain modifications to the Nuclear Regulatory Committee for repairing a leaking nozzle. According to the proposal, a sleeve is rolled into an existing nozzle and deformed against the ID of the existing nozzle such that a seal is created between the nozzle and vessel. A similar design was also proposed for a plug. However, the Nuclear Regulatory Committee declined the proposals because that rolling technique causes high tensile stresses at the rolled transition region which promotes PWSCC, and because that repair method was only leak limiting which could allow the boric acid in the reactor coolant to erode a portion of the carbon steel vessel.

Nozzles are currently being replaced in pressurized water reactor (PWR) nuclear power facilities both because they have failed and as a preventive measure where a statistical analysis has indicated a high probability of a future failure. Nozzle failures and such statistically indicated failures have been occurring frequently enough to be a major concern for nuclear power plant operators (and owners) for a number of reasons including the high cost of repairs and the millions of dollars in lost revenue due to plant shut down. Therefore, there is a need for a replacement nozzle and a method for replacing nozzles that have failed or may fail in the future, that (a) reduce the time and expense required to make the replacement and (b) do not require confined entry into a pressure vessel, which reduce radiation exposure to the personnel performing the replacement, and (c) reduce the susceptibility to PWSCC and do not result in further degradation of the vessel, and accordingly reduce the risk of future failures. A similar need also exists for a nozzle for initial installation applications and a method of initially installing such a nozzle in a vessel.

The invention disclosed herein addresses the above-described needs and avoids the problems discussed above, and provides nozzles and procedures for installing nozzles mechanically in pressure vessels in nuclear power facilities (and in other fields) that do not employ (a) a structural weld or a seal weld, and (b) any part of an existing nozzle which is being replaced.

OBJECTS AND SUMMARY OF THE INVENTION

It is an object of the invention disclosed herein to reduce the susceptibility to PWSCC of replacement nozzles and initial installation nozzles in nuclear power facilities as much as reasonably achievable, and thereby reduce the possibility of future nozzle failures.

It is another object of the invention to reduce the time and expense involved with installing a replacement or initial installation nozzle in a vessel, particularly in a nuclear power facility.

It is another object of the invention to not require confined entry into a vessel in order to install a replacement or initial installation nozzle in the vessel, particularly in a nuclear power facility.

It is another object of the invention to reduce the exposure to radiation of repair personnel in a nuclear power facility while installing a replacement or initial installation nozzle in a vessel.

It is another object of the invention to install a replacement or initial installation nozzle in a vessel without structurally welding the nozzle to the vessel, particularly in a nuclear power facility.

It is another object of the invention to install a replacement or initial installation nozzle in a vessel without seal welding the nozzle to the vessel, particularly in a nuclear power facility.

It is another object of the invention to install a replacement or initial installation nozzle in a vessel without structurally welding and without seal welding the nozzle to the vessel, particularly in a nuclear power facility.

It is another object of the invention when replacing a nozzle in a vessel to remove the entire existing nozzle and to install a complete (whole) mechanical nozzle replacement, thereby removing the defective portion of the existing nozzle and avoiding further degradation to the vessel.

It is another object of the invention to provide nozzles which may be installed in vessels while achieving the objects set forth above.

The invention in achieving the above and other objects provides a full replacement or initial installation nozzle for vessels and a method for mechanically attaching the full nozzle to the vessel without any welding at all, i.e.,without using a structural or seal weld. The full nozzle is clamped or bolted to the vessel or attached to the vessel with an interference fit, and a seal is obtained using an interference fit between metal surfaces of the nozzle and the vessel (which may be polished), and/or by use of gasket materials. In the case of replacement, the entire existing nozzle is removed and the full nozzle is mechanically attached and mechanically sealed. The invention departs significantly from the prior art of nozzle replacement and initial installation by not utilizing a weld of any kind, which eliminates the stresses imposed by welding and significantly reduces the risk of a PWSCC type failure.

The method for replacing a nozzle attached to and sealed against a vessel comprises removing the entire existing nozzle from the vessel, mechanically attaching the full replacement nozzle to the vessel with the replacement nozzle passing through the bore in the vessel from which the existing nozzle was removed, and mechanically sealing the replacement nozzle in or at the bore. Where a nozzle is initially installed (e.g., in a new vessel or as an additional nozzle on an existing vessel), a bore of the desired configuration is made in the vessel, and a new nozzle is installed generally as described for installing a replacement nozzle.

In some embodiments of the invention, the existing bore is modified (e.g., configured to conform to the configuration of the nozzle). Depending upon the pressure to be encountered in the vessel, a mechanical seal is obtained by contacting the metal surfaces of the nozzle and the bore, which may or may not be polished, and/or by the use of gasket material. Polishing contacting metal to metal surfaces permits the surfaces to make intimate contact over a substantial area or areas thereof when forced together (e.g. in an interference fit or simply interfering parts forced together), and thereby create a seal of the contacting surfaces without in some applications requiring gasket material between the contacting surfaces. A gasket material employed for mechanically sealing the nozzle against the vessel may be a nickel alloy or other alloy plated or sprayed on the nozzle and/or possibly on the wall of the bore which upon compression forms a seal, or any suitable seal material which when positioned between two surfaces and compressed therebetween seals the two surfaces in the particular application of interest. As used herein, "positioning" or "placing" gasket material on or between the nozzle (and/or a flange thereof) and the vessel is meant to encompass plating or spraying the gasket material on a surface or surfaces of the nozzle and/or vessel as well as mechanically providing a material between two surfaces of the nozzle and vessel.

As mentioned above, mechanically attaching the nozzle to the vessel may be accomplished by clamping, bolting or an interference fit of the replacement nozzle to the vessel. Some clamping embodiments comprise a nozzle which has a threaded portion projecting exteriorly of the vessel, means associated at least with the nozzle for engaging the vessel and preventing the nozzle from being withdrawn through the bore, and a nut threaded and tightened on the nozzle which bears against the exterior of the vessel and causes the engaging means to firmly engage the vessel. A spacer may be provided between the nut and the exterior of the vessel, in which case the nut bears against the exterior of the vessel through the spacer. The engaging means referred to above may comprise an interior flange attached to the nozzle surrounding the bore on the interior of the vessel, or interfering portions of the nozzle and the bore. Where the engaging means comprises interfering portions of the nozzle and bore, the nozzle and the bore may have circular cross sections, and a portion of the nozzle within the bore has a larger diameter than the largest diameter of the bore thereby providing the interfering portions. For example, the bore and nozzle may both be tapered. Gasket material is preferably positioned between the nozzle and the vessel to ensure a mechanical seal therebetween. In another clamping embodiment, the means for mechanically attaching the nozzle to the vessel comprises an exterior flange bolted to the vessel and means associated at least with the nozzle for engaging the vessel and preventing the nozzle from passing through the bore to the interior of the vessel.

In still another clamping embodiment, the nozzle includes a separate sleeve and a nozzle body. The sleeve is externally threaded and the bore includes a threaded portion which receives the sleeve. The nozzle body and the bore are configured so that tightening the sleeve in the bore forces the nozzle body into engagement with the bore to clamp the nozzle body to the vessel. A mechanical seal is obtained from contacting metal surfaces of the nozzle body and the bore and/or gasket material as described above.

Two specific embodiments of bolting the nozzle to the vessel include (1) threading the nozzle in the bore and (2) attaching an exterior flange (attached to or engaging the nozzle) to the vessel with bolts. In the first of those embodiments, the means for mechanically attaching the nozzle to the vessel comprises threads on a portion of the nozzle, a threaded portion of the bore, and means associated at least with the nozzle for engaging the vessel and preventing the nozzle from being withdrawn or pushed through the bore of the vessel.

Where the engaging means comprises interfering portions of the nozzle and bore, the nozzle and the bore may have circular cross sections, and a portion of the nozzle within the bore has a larger diameter than the largest diameter of the bore thereby providing the interfering portions. For example, the bore and the nozzle may both be tapered. A tapered nozzle which is threaded in the vessel's bore may be inserted into the bore either from the interior or the exterior of the vessel depending upon the direction of the taper.

In the clamping and bolting embodiments described herein, mechanically sealing the nozzle in or at the bore may comprise positioning gasket material between the nozzle (and/or a flange thereof) and the vessel and pressing that material against the vessel in the bore or at an end of the bore sufficiently to create a seal between the nozzle and the vessel, or mechanically attaching the nozzle to the vessel so as to force at least a part of the nozzle against the vessel to mechanically seal the nozzle to the vessel, or both. A mechanical seal may be obtained by pressing the flange against the vessel, or configuring the nozzle and bore to interfere and forcing the nozzle into engagement with the bore, e.g., by means of a tapered bore and nozzle as described above. Where a mechanical seal is created by forcing the nozzle against the vessel, to obtain a seal it may be necessary to machine polish the contacting surfaces as discussed above. However, it may be necessary to position gasket material between such contacting surfaces if high pressure and thermal transient conditions exist in the vessel. In such a case, the nozzle and vessel surfaces may not require polishing. For example, the gasket material may be positioned between the interior and exterior flanges referred to above and the interior and exterior, respectively, of the vessel, or along the tapered regions of the nozzle and bore.

In another embodiment of mechanically sealing the nozzle to the vessel, the mechanically sealing means comprises at least one O-ring type gasket material between the nozzle and the interior of the bore. In yet another embodiment, a sleeve is mechanically attached in the bore by a shrink fit, rolling, etc., the nozzle is inserted into the sleeve, thereby providing a corrosion barrier for the vessel, and gasket material is positioned between a flange attached to the nozzle and the vessel. The bore, sleeve and nozzle may all be cylindrical or they may all be tapered.

In one method of mechanically attaching the nozzle to the bore with an interference fit, the nozzle has a larger outer diameter than the inner diameter of the bore at a given temperature of the nozzle and the vessel adjacent the bore. A temperature gradient is provided between the vessel adjacent the bore and the nozzle sufficient to enlarge the diameter of the bore, reduce the diameter of the nozzle, or both to allow the nozzle to be inserted into the bore, and sufficient when the temperature gradient is substantially reduced to mechanically attach the nozzle in the bore in the temperature range of interest. After the nozzle has been inserted into the bore, the temperature gradient is reduced effective to produce the mechanical attachment.

A nozzle attached as described above without an interior flange may be provided with an anti-ejection feature which prevents the nozzle from being ejected from the vessel should the mechanical attachment of the nozzle thereto fail. The anti-ejection feature may be embodied by at least one flange which is formed on the interior end of the nozzle and mechanically engages the interior of the vessel surrounding the opening to the bore.

Inventive nozzles, and related attachment methods, have so far been described with respect to "vessels" in general, which term broadly encompasses piping. Specifically, all of the clamping, bolting and interference fit attachment embodiments described above are applicable to pressure vessels such as a pressurizer vessel or reactor vessel and to large bore piping. However, the invention also provides a method and apparatus specifically for attaching a nozzle to a large bore pipe in which the thickness of the pipe only allows minimum diameter changes in the bore or no installation of bolts in the pipe. A hole or bore through the circumference of the pipe is either made or an existing hole or bore in the pipe's circumference is used. A nozzle is provided having a first portion with a diameter therealong smaller than the diameter of the bore, a second portion with a diameter therealong larger than the diameter of the bore, and a flange therebetween. The nozzle portion with the smaller diameter is inserted into the bore with the flange bearing against the exterior circumference of the pipe. The flange is attached to the pipe with a suitable clamping device, and the exterior of the nozzle is mechanically sealed to the pipe. Sealing means for mechanically sealing the nozzle may comprise gasket material positioned between the flange and the outer circumference of the pipe and/or between the nozzle and the pipe which is compressed by the clamping device. The particular configurations of the smaller diameter portion of the nozzle and the ID of the bore may be conformed, for example as described above for certain vessel embodiments. Also, the mechanical sealing mechanism may be one described above for the vessel embodiments.

BRIEF DESCRIPTION OF THE DRAWINGS

The invention is illustrated in the figures of the accompanying drawings which are meant to be exemplary and not limiting, in which like numerals refer to like or corresponding parts, and in which:

FIG. 1 is an elevation view, partially in vertical section, of a conventional pressurizer vessel in a typical nuclear power generating plant;

FIG. 2 is a section view of one of the conventional nozzles attached to the vessel depicted in FIG. 1 taken along line 2—2 in FIG. 1;

FIG. 3 is a section view similar to that of FIG. 2 of a replacement nozzle according to the invention and part of the vessel depicted in FIG. 1;

FIGS. 4–12 are section views similar to that of FIG. 2 of additional embodiments of replacement nozzles according to the invention and part of a pressurizer vessel;

FIGS. 13–15 are section views similar to that of FIG. 2 depicting a replacement nozzle similar to the one depicted in FIG. 12 but with an anti-ejection feature, and illustrating the sequence for activating the anti-ejection feature, in which FIG. 13 depicts a bolt threaded to the replacement nozzle prior to activation of flanges which embody the anti-ejection feature, FIG. 14 depicts the flanges at the completion of activation with the bolt threaded to the replacement nozzle, and FIG. 15 depicts the flanges fully activated showing one flange engaging the interior of the vessel with the bolt removed from the nozzle;

FIGS. 16–18 illustrate the sequence for attaching a new or replacement nozzle to a pipe in accordance with the invention, in which FIG. 16 depicts the pipe with a bore therein for the nozzle, FIG. 17 depicts the nozzle positioned in the bore, and FIG. 18 depicts the nozzle clamped to the pipe by a clamping device.

DESCRIPTION OF THE PREFERRED EMBODIMENTS

Figure 7:
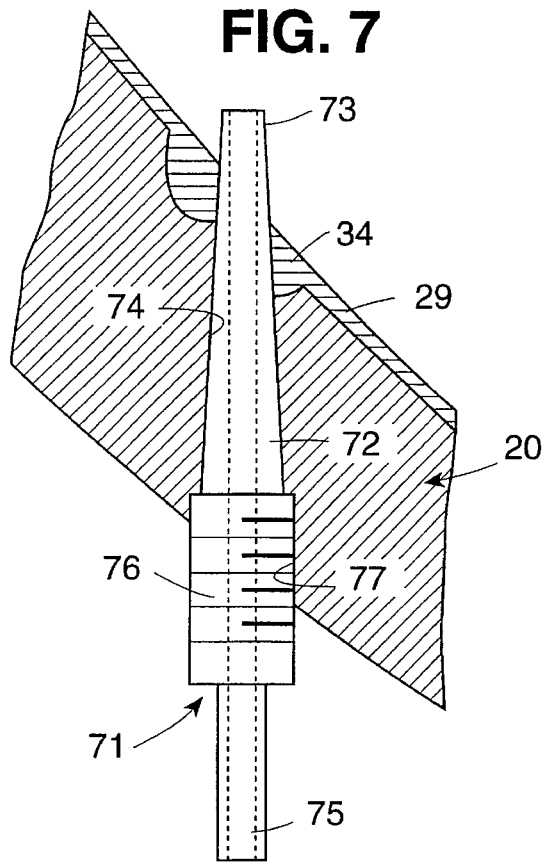

Although the preferred embodiments illustrated in the drawings are described below in connection with replacement of a welded nozzle in the pressurizer vessel of a nuclear power facility and the replacement of a nozzle in a large bore pipe, the invention is not limited to that and encompasses installation of nozzles in other vessels and piping. The invention further encompasses the initial installation of nozzles in new as well as in existing vessels and piping.

In the embodiments of replacement nozzles depicted in FIGS. 3–15, the original welded nozzle (FIG. 2) has been completely removed, leaving the J-welds 34 and the cladding 29 surrounding the bore 30 for the nozzle substantially in tact The old nozzle may be machined or drilled out; therefore destroying the nozzle. In the embodiments depicted in FIGS. 3–6, 9 and 16–18, the replacement nozzle 40, 40a, 40b, 61, 71b, 120 is clamped in the bore or hole 30, 30a, 30b, 60, 74b, 124, respectively.

Referring to FIG. 3, replacement nozzle 40 includes a tubular nozzle body 42 having an interior end 44 positioned in the interior of the vessel 20 at the entrance to the bore 30 and an interior flange 46 radically extending about the periphery of nozzle end 44. The flange 46 may be attached to the nozzle body 42 in any suitable manner, e.g., by welding (if welded the nozzle should be stress relieved prior to installation), or may be formed as one piece with the nozzle body 42. The opposite end 48 of the nozzle body 42 projects from the exterior of the vessel 20 and includes a threaded portion 50 positioned exteriorly to the vessel. The nozzle 40 is inserted into bore 30 from the interior of the vessel 20, a nut 52 is threaded to the threaded portion 50 of the nozzle body 42 and, as tightened, draws the flange 46 into engagement with the interior of the vessel while the nut 52 bears against the exterior of the vessel through a spacer 54. The surface 55 of spacer 54 adjacent the exterior of the pressurizer is curved to follow the contour of the vessel exterior. This arrangement mechanically attaches the nozzle body 42 to the vessel 20. Substantially the same procedure may be used to attach a nozzle to a large bore pipe.

With continued reference to FIG. 3, a mechanical seal is obtained without welding between the exterior of the nozzle body 42 and the vessel by a polished flange to polished vessel seal (discussed above) or gasket material 56 positioned and compressed between the interior flange 46 and the interior of the vessel. As discussed above, the gasket material 56 may be a nickel alloy plated to the flange or other suitable seal material. Depending upon pressure ratings and thermal transient conditions, a spring washer 55 may be positioned between the nut 52 and the spacer 54 to maintain a constant pressure on the nozzle and vessel. The spring washer overcomes the differential thermal growth of the vessel and nozzle during thermal transient conditions of the vessel by forcing the flange 46 (through any intervening gasket material 56) in contact with the vessel. The nut 52, the spacer 54, the flange 46 and the nozzle body may all be made of Alloy 690 or other suitable material such as stainless steel for the application just described as a replacement nozzle for a nuclear power plant pressure vessel. This arrangement mechanically seals the exterior of nozzle 40 with the vessel 20.

Replacement nozzle 40a depicted in FIG. 4 is also clamped to the vessel 20. Replacement nozzle 40a includes a tapered nozzle body 42a having an interior end 44a positioned at or in the interior of the vessel 20 at the entrance to the bore 30a. Bore 30a is also tapered, rather than cylindrical, and the tapered bore and tapered nozzle body portion form one part of the mechanical clamping system for the nozzle 40a, as described below. The nozzle body 42a and bore 30a both taper from a larger diameter at the interior end 44a of the nozzle body 42a to a smaller diameter at the exterior end 48a of the nozzle body, which requires that the nozzle body 42a be inserted into the bore 30a from inside the vessel. The opposite end 48a of the nozzle body 42a projects from the exterior of the vessel 20 and includes a cylindrical portion 50a positioned exteriorly of the vessel. Like replacement nozzle 40 depicted in FIG. 3, portion 50a is threaded, and replacement nozzle 40a includes a nut 52a threaded onto the threaded portion 50a, and a spacer 54a having a curved surface 55a adjacent the vessel 20 to follow the contour of the vessel exterior, which form another part of the clamping system. However, this other bore part of the clamping system employs interfering portions of the nozzle body 42a and the bore 30a bearing against each other instead of the interior flange 46 in the FIG. 3 embodiment bearing against the interior of the vessel. The nozzle body 42a within bore 30a is tapered the same as bore 30a, but tapers to a larger diameter than the largest diameter within bore 30a. As a result, tightening nut 52a on the threaded portion 50a of the nozzle body 42a draws the nozzle body within bore 30a into engagement with the bore 30a to clamp nozzle 42a to vessel 20. This arrangement mechanically attaches the nozzle body 42a to the vessel 20. Nozzle 40 may use interfering portions of the nozzle and bore as described for nozzle 40a for part of the clamping system, but the taper directions of the tapered bore and nozzle would be reversed from that shown in FIG. 4.

With continued reference to FIG. 4, a mechanical seal is obtained between the polished exterior of the nozzle body 42a and the polished wall of bore 30a by engagement of the two polished surfaces. Nut 52a is tightened sufficiently to ensure that the seal is obtained. If necessary, a spring washer (not shown in FIG. 4) may be positioned between nut 52a and spacer 54a. Instead of polished surfaces, gasket material 56, similar to that shown in FIG. 8 but not shown in FIG. 4, may be positioned within bore 30a between the bore wall and the exterior of the nozzle body 42a to create the seal.

Replacement nozzle 40b depicted in FIG. 5 employs a clamping system similar to that for nozzle 40a in FIG. 4, but does not include a spacer. The exterior of vessel 20 includes a flat 54b against which the nut 52b bears. Similar to nozzle 40a in FIG. 4, the nozzle body 42b and the bore 30b are tapered, and the clamping system employs interfering portions of the nozzle body and the bore which function as part of the mechanical clamping system to form the mechanical seal of the exterior of the nozzle with the vessel as described for nozzle 40a. If necessary, a spring washer as described for nozzle 40a may be employed between nut 52b and flat 54b. The surfaces of the interfering portions may be polished or a gasket material 56 similar to that shown in FIG. 8 but not shown in FIG. 5 may be provided between nozzle body 42b and the walls of the bore 30b.

Replacement nozzle 61 depicted in FIG. 6 employs still another clamping system for mechanically attaching the nozzle to vessel 20. Replacement nozzle 61 includes a nozzle body 62 having a tapered portion 63 ending in a smaller diameter end 64 projecting from the interior entrance of the bore 60 in the vessel 20 and a large diameter end 65 within bore 60. The nozzle body 62 also includes a tubular portion 66 projecting from the exterior of the vessel 20. The diameter of the tubular portion 66 is smaller than the larger diameter end 65 of the tapered portion 63, and a flange 67 is formed where the diameter of the bore changes from the smaller to larger diameter. The nozzle 61 also includes an externally threaded cylindrical sleeve 68, and the bore 60 includes a threaded cylindrical portion 69 and a tapered portion 70. Tightening the sleeve 68 using the wrenching flats thereof in the threaded bore portion 69 against the flange 67 of the nozzle body forces the tapered portion 63 of the nozzle body into mechanical engagement with the tapered portion 70 of the bore 60 to mechanically clamp the nozzle body 62 to the vessel 20. A mechanical seal is obtained between the contacting surfaces of the tapered nozzle portion 63 and the tapered bore portion 70 as described above. If necessary, a spring washer as described for nozzle 40a may be employed between nozzle sleeve 68 and the flange 67 of the nozzle body 62.

FIGS. 7, 8, 10 and 11 depict embodiments of replacement nozzles 71, 71a, 71c, 71d which are bolted to the vessel 20. Although the nozzle 71b depicted in FIG. 9 is clamped to the vessel 20, it is discussed below with the bolted embodiments because it is similar to the bolted arrangement of FIGS. 10 and 11 in that a flange 86 engaging the nozzle 71b is bolted to the vessel 20.

Referring to FIG. 7, replacement nozzle 71 includes a tapered nozzle body 72 having a smaller diameter end 73 at the interior entrance of the tapered bore 74 in the vessel 20, a tubular end 75 projecting from the exterior of the vessel 20 and a larger diameter, tubular threaded portion 76. The diameter of the nozzle body 72 increases from the interior end 73 to the threaded portion 76. The diameter of bore 74 similarly increases from the interior end of the bore to a cylindrical threaded portion 77 at the exterior end of the bore. Wrenching flats are provided on nozzle body 72 adjacent the threaded portion 76 for tightening the nozzle into the threaded portion 77 of the bore 74. The nozzle 71 is structurally attached to the vessel 20 by tightening the nozzle into the bore. The tapered portion of the nozzle body 72 and the tapered portion of the bore 74 cooperate when the nozzle is tightened into the bore to provide a mechanical seal between the nozzle body and the bore, as described generally for nozzle 40a shown in FIG. 4, except that the tapers of the nozzles and holes are reversed, i.e., nozzle 71 is inserted into bore 74 from the exterior of the vessel as opposed to being inserted from the interior of the vessel in FIG. 4. The interfering portions of the nozzle body 72 and bore 74 are polished, or gasket material 56 similar to that shown in FIG. 8 but not shown in FIG. 7 may be provided between nozzle body 72 and the walls of the bore 74.

Figure 8:
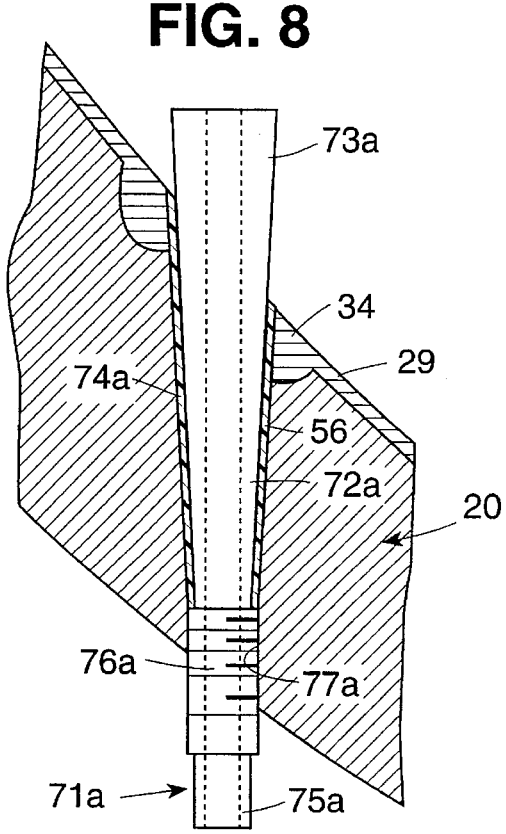

The replacement nozzle 71a and bore 74a depicted in FIG. 8 are similar to those depicted in FIG. 7 except that the tapers are reversed so that the nozzle is inserted into the bore from the interior of the pressurizer. A mechanical seal is obtained as described above.

Figure 9:
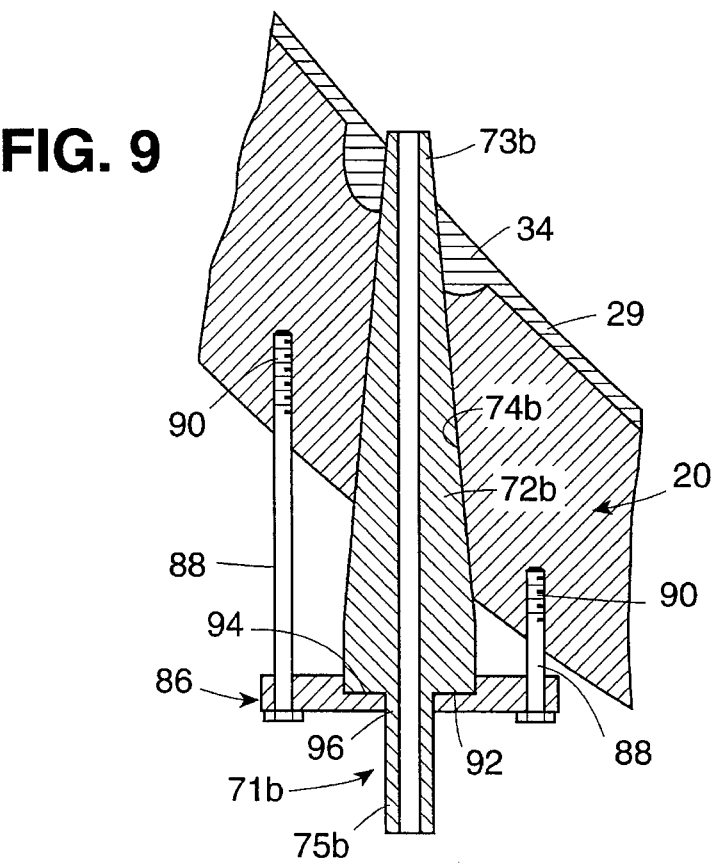

Replacement nozzle 71b depicted in FIG. 9 is clamped to vessel 20, and is similar to nozzle 71 in FIG. 7, except that it is clamped to the vessel 20 by an exterior flange 86 bolted to the vessel 20 by bolts 88 and threaded holes 90 in the exterior wall of the vessel, instead of bolted to the vessel by threaded portions on the nozzle body and in the bore of the vessel. Exterior flange 86 is a separate piece from nozzle 71*b*, and is engaged with nozzle 71*b* as follows. Nozzle 71*b* includes a tubular end 75*b* of reduced diameter projecting from the vessel 20 which forms a circular shoulder or flange 92. Flange 86 includes a circular recess 94 with a central hole 96 therein. The shoulder 92 on the nozzle 71*b* is received in the recess 94 in the flange 86 with the tubular portion 75*b* of the nozzle passing through the central hole 96 in the flange's recess 94. Bore 74*b* and nozzle body 72*b* are tapered generally as described for nozzle 71 in FIG. 7, and tightening bolts 88 causes the flange 86 to draw the nozzle body 72*b* into bore 74*b* into frictional engagement therewith. If necessary, spring washers (not shown) may be provided between the heads of bolts 88 and flange 86. A mechanical seal is obtained between the exterior of the nozzle body 72*b* and the walls of bore 74*b*, as described above.

Figure 10:
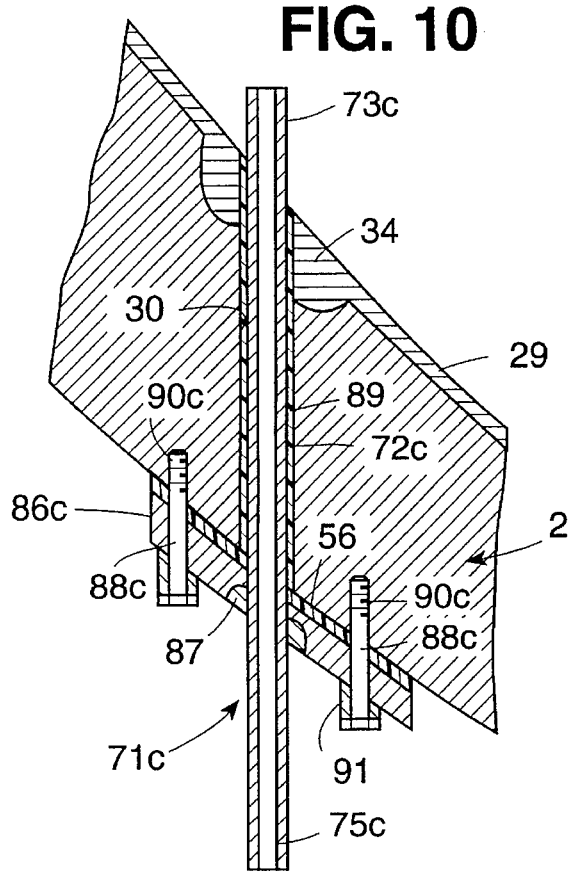
Figure 11:
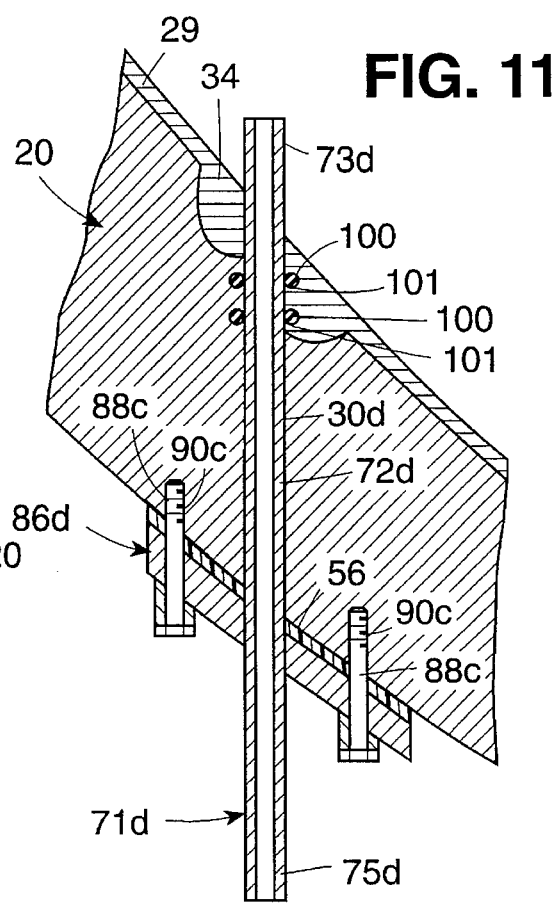

Referring to FIG. 10, replacement nozzle 71*c* is bolted to vessel 20 by an exterior flange 86*c* and bolts 88*c*. Both the nozzle body 72*c* and the bore 30 are cylindrical, and the mechanical attachment of the nozzle 71*c* to the vessel is achieved by bolting the flange 86*c* directly against the exterior wall of the vessel. The flange 86*c* is a separate piece from the nozzle body 72*c* and may be attached to the nozzle body in any suitable manner, e.g., by a weld 87 (which should be stressed relieved prior to installation). However, the flange 86*c* and nozzle body 72*c* may be formed as one piece, as shown in FIG. 11. The flange 86*c* is contoured to follow the contour of the exterior wall of the vessel 20 against which it bears. Spacers 91 are provided between the heads of bolts 88*c* and the flange 86*c*. A thin corrosion resistant sleeve 89, e.g., made of Alloy 690, is shrink fitted or rolled into bore 30 so as to mechanically seal the sleeve 89 to the bore 30. Gasket material 56 between flange 86*c* and the exterior vessel wall provides the mechanical seal.

Referring to FIG. 11, nozzle 71*d* is mechanically attached as described for nozzle 71*c* of FIG. 10, includes a seal between flange 86*d* and the vessel, and is also sealed against bore 30*d* by O-rings 100 made of gasket material received in grooves 101 in the wall of bore 30*d*. Also, exterior flange 86*d* and nozzle body 72*d* are formed as one piece (or welded as shown in FIG. 10). In an alternate embodiment of nozzle 70*d*, which is not shown, the mechanical seal may be provided entirely by the O rings 100 in grooves 101 in the wall of bore 30*d*. In this alternate embodiment, the gasket material 56 may be omitted between flange 86*d* and the vessel.

Figure 12:
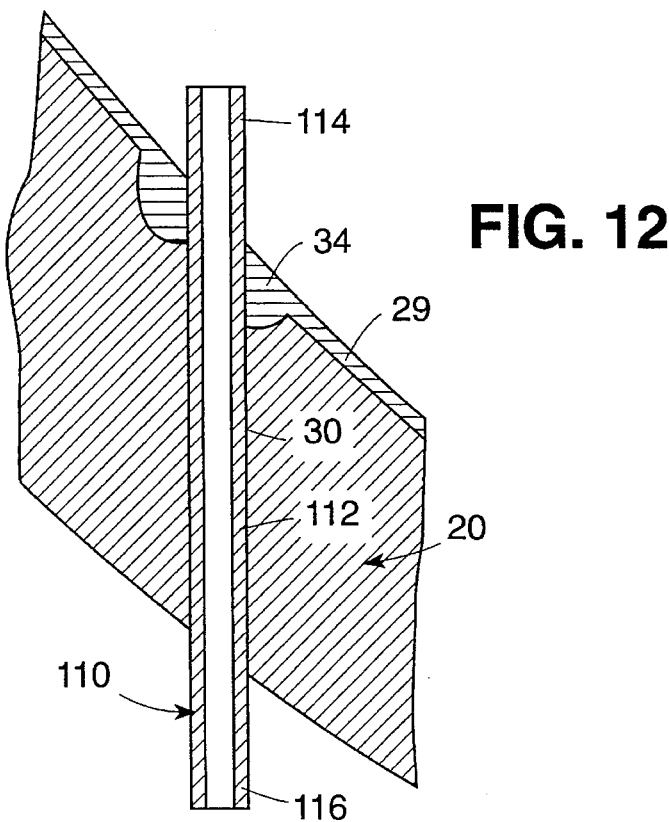

Replacement nozzle 110 shown in FIG. 12 is frictionally attached to the vessel 20 and mechanically sealed by an interference fit of nozzle 110 in bore 30. Nozzle 110 is tubular and bore 30 is cylindrical. At equal temperatures of the nozzle 110 and the vessel portion surrounding the bore 30, the diameter of the nozzle is slightly larger than the diameter of the bore. The nozzle 110 is inserted into the bore by creating a substantial temperature gradient between the two so that the diameter of the nozzle is reduced or the diameter of the bore is increased, or both. The temperature of the vessel 20 surrounding the bore 30 is increased to expand the diameter of the bore, or the nozzle 110 is cooled to reduce its diameter, or both. After the nozzle 110 has been inserted into the bore 30, the temperature gradient is reduced so that the nozzle 110 frictionally engages the wall of the bore 30 in an interference fit to both mechanically attach the nozzle and mechanically seal its exterior with the wall of the bore at the operating temperatures of interest. The exterior of the nozzle and the bore are polished to assist in creating a seal therebetween. If desired, a mechanical seal or seals, in addition to the mechanical seal obtained from the interference fit and polished surfaces, may be provided as discussed herein.

Figure 13:
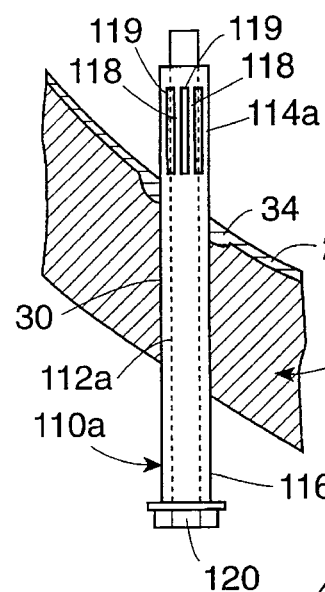
Figure 14:
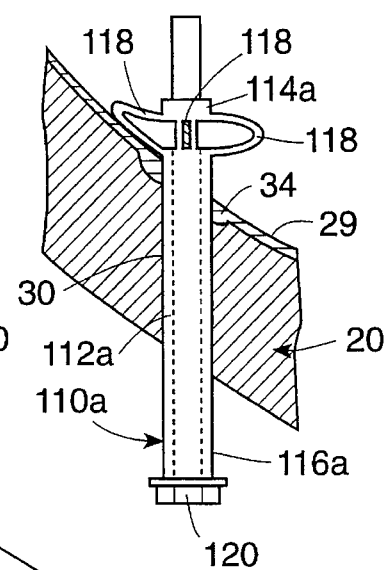
Figure 15:
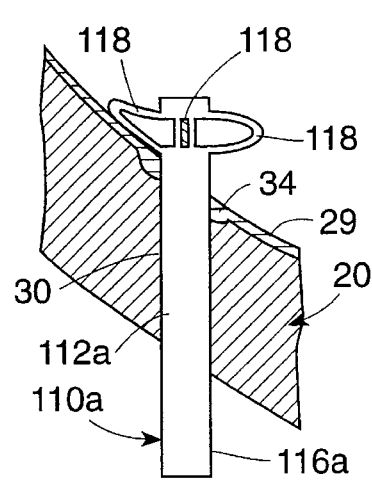

Replacement nozzle 110*a* depicted in FIGS. 13–15 is mechanically attached and sealed in bore 30 as described for nozzle 110 in FIG. 12, and includes an anti-ejection feature provided by a molley-bolt arrangement which activates flanges 118 (FIGS. 14 and 15) formed from slots 119 (FIG. 13) in the interior end 114*a* of the nozzle. Nozzle 110*a* includes an internally threaded portion at its interior end 114*a*. After nozzle 110*a* has been mechanically attached in the bore 30, as described above in connection with nozzle 110 of FIG. 12, a threaded bolt 120 is tightened into nozzle 110*a*, which causes the interior end 114*a* of the nozzle to deform in molley-bolt fashion and form the flanges 118 (FIG. 14). After activation (formation) of the flanges 118 and engagement thereof with the vessel 20, the bolt 120 is removed (FIG. 15). Depending on the curvature of the interior wall of the (although only one flange is shown in engagement in FIGS. 14 and 15) to ensure that the nozzle will not be ejected from the vessel if the mechanical attachment should fail.

Figure 16:
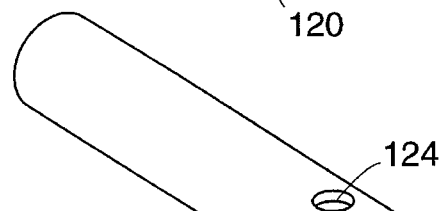
Figure 17:
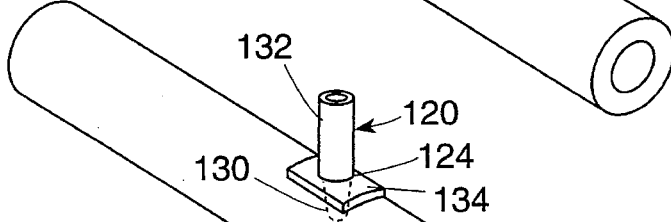
Figure 18:
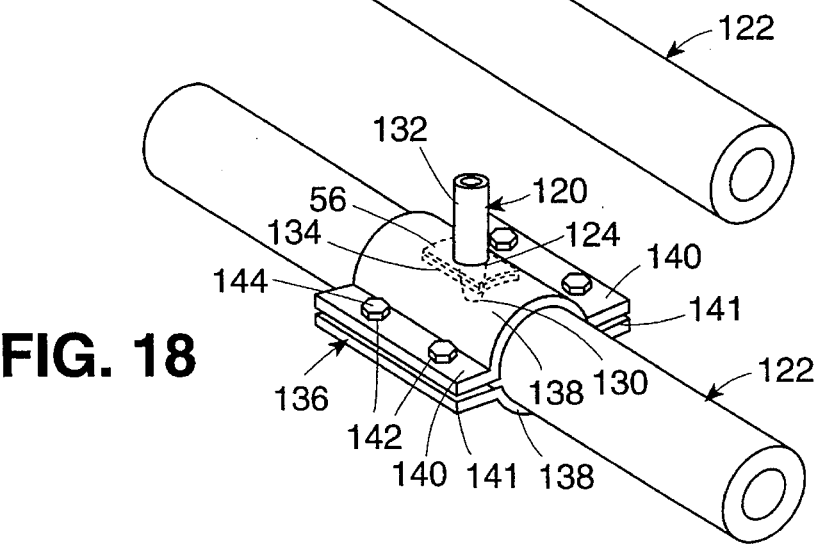

All of the embodiments depicted in FIGS. 3–15 may be used in large bore piping, as well as pressure vessels in general. The embodiments of FIGS. 3, 4, 5 and 8 require entry into the pipe or a remote system to install them. FIGS. 16–18 illustrate a method for attaching a nozzle 120 specifically to large bore piping 122. Referring to FIG. 16, piping 122 includes a bore 124 therein which may have pre-existed and in which a nozzle may have been attached by welding or otherwise, or which may be formed to accept a nozzle for the first time. The nozzle 120 includes a tapered portion 130 (FIGS. 17 and 18) which is received in bore 124, a tubular portion 132 which projects from hole 124, and a flange 134 positioned at the transition of the nozzle from tapered to tubular. The flange 134 is contoured to follow the exterior contour of the piping. The diameter of the tapered portion 130 of the nozzle 120 adjacent the flange 134 is approximately the same as the diameter of the bore 124. Accordingly, the tapered portion 130 of the nozzle interferes with the bore 124 and the flange 134 bears against the exterior of the piping to secure the nozzle against movement into the piping. Gasket material 56 is positioned between the flange 134 and the piping 122, which produces a mechanical seal when the flange 134 is clamped by the clamping device 136 shown in FIG. 18. Clamping device 136 includes split cylinder halves 138, each of which have flanged longitudinal edges 140, 141 with spaced holes 142 therein. The split cylinder halves 138 are sized to fit on the piping 122 with one cylinder halve over the nozzle's flange 134 and with the flanged edges 140, 141 slightly spaced apart. Nuts (not shown) are provided or the holes 142 in one of the cylinder halves are threaded so that tightening bolts 144 passing through holes 142 in the flanged edges 140, 141 of the cylinder halves results in clamping the nozzle's flange 134 to the piping. A mechanical seal is provided by compression of the gasket material 56 between the nozzle's flange 134 and the piping 122.

In the embodiments described above, a structurally welded and seal welded nozzle may be removed by cutting or machining operations. As mentioned, the invention is also applicable to replacement of nozzles attached and sealed in other ways, (e.g., as described in the prior art discussed above and by mechanical attachment and sealing as described in the prior art discussed above and by mechanical attachment and sealing as described herein). Further, the invention is applicable to the new installation of nozzles as opposed to replacement of existing nozzles.

In the claims, the term vessel is used in a broad sense and is meant to include, but not to be limited to, vessels, piping, etc., of different types which may operate under pressure and which may be used in different nuclear and non-nuclear ASME applications, and the term nozzle is used in a broad sense and is meant to include, but not be limited to, nozzles, sleeves, large bore pipes, pipe portions, etc.

While the invention has been described and illustrated in connection with preferred embodiments, many variations and modifications, as will be evident to those skilled in this art, may be made without departing from the spirit and scope of the invention. The invention, as set forth in the appended claims, is thus not to be limited to the precise details of construction set forth above, as such variations and modifications are intended to be included within the spirit and scope of the invention as defined in the appended claims.

What is claimed is:

1. A method for replacing a nozzle which is attached to a pressure vessel of a nuclear power facility passing through a bore in the vessel with a replacement nozzle, comprising:

removing the entire nozzle to be replaced from the vessel;

providing a mechanical attachment of the full replacement nozzle to the vessel with the replacement nozzle passing through the bore in the vessel from which the nozzle to be replaced was removed; and providing a mechanical seal of the full replacement nozzle with the vessel implemented either as part of the step of providing a mechanical attachment of the nozzle to the vessel or separately therefrom;

said mechanical attachment and said mechanical seal not including a weld of the nozzle to the vessel.

2. The method of claim 1 wherein the nozzle to be replaced is welded to the vessel.

3. The method of claim 1 wherein providing the mechanical attachment of the replacement nozzle to the vessel comprises clamping the replacement nozzle to the vessel.

4. The method of claim 1 wherein providing the mechanical attachment of the replacement nozzle to the vessel comprises bolting the replacement nozzle to the vessel.

5. The method of claim 4 wherein bolting the replacement nozzle to the vessel comprises threading the replacement nozzle in the bore.

6. The method of claim 4 wherein bolting the replacement nozzle to the vessel comprises bolting to the vessel a flange of the replacement nozzle which is attached to or engaged with the replacement nozzle.

7. The method of claim 1 wherein providing the mechanical attachment of the replacement nozzle to the vessel comprises attaching the nozzle in the bore with an interference fit.

8. The method of claim 1 wherein providing a mechanical seal of the nozzle to the vessel comprises positioning gasket material between the replacement nozzle and the vessel and pressing that material against the vessel in or adjacent the bore sufficiently to create a seal between the replacement nozzle and the vessel.

9. The method of claim 1 wherein providing a mechanical seal of the nozzle to the vessel comprises configuring the replacement nozzle and the bore so that a mechanical seal is formed therebetween when the replacement nozzle is forced into the bore and forcing at least a part of the replacement nozzle into a sealing engagement with the bore.

10. A method of mechanically attaching a nozzle in a bore of a pressure vessel of a nuclear power facility, the nozzle having a larger outer diameter than the inner diameter of the bore at a same given temperature of the nozzle and the vessel adjacent to the bore, the method comprising:

providing a temperature gradient between the vessel adjacent to the bore and the nozzle sufficient to insert the nozzle into the bore and sufficient when the temperature gradient is substantially reduced to provide a mechanical attachment of the nozzle to the vessel in the bore and such that a mechanical seal is produced between the nozzle and the wall of the bore, said mechanical attachment and said mechanical seal not including a weld of the nozzle to the vessel;

inserting the nozzle into the bore; and reducing said temperature gradient effective to produce said mechanical attachment and said mechanical seal.

11. The combination of a pressure vessel of a nuclear power facility which has a bore therein and a full nozzle extending completely through said bore, means for mechanically attaching said nozzle to said vessel which does not include a weld of said nozzle to said vessel and means for mechanically sealing said nozzle to said vessel which does not include a weld of said nozzle to said vessel.

12. The combination of claim 11 wherein said mechanically attaching means comprises threads on a portion of said nozzle projecting from said vessel, means associated at least with said nozzle which engages said vessel and prevents said nozzle from being withdrawn through said bore to the exterior of said vessel, and a nut threaded and tightened on said nozzle which bears against the exterior of said vessel and causes said means to firmly engage said vessel.

13. The combination of claim 12 comprising a spacer between said nut and the exterior of said vessel, said nut bearing against the exterior of said vessel through said spacer.

14. The combination of claim 12 wherein said engaging means comprises a flange attached to said nozzle surrounding said bore on the interior of said vessel.

15. The combination of claim 12 wherein said engaging means comprises interfering portions of said nozzle and said bore.

16. The combination of claim 15 wherein said nozzle and said bore have circular cross sections, and a portion of said nozzle within said bore has a larger diameter than the largest diameter of said bore thereby providing said interfering portions.

17. The combination of claim 16 wherein at least a portion of said bore and at least a portion of said nozzle are tapered.

18. The combination of claim 14 wherein said mechanically sealing means comprises gasket material positioned between said flange and the interior of said vessel.

19. The combination of claim 14 wherein said mechanically sealing means comprises a mechanical engagement of said flange and the interior of said vessel sufficient to produce a seal therebetween.

20. The combination of claim 15 wherein said mechanically sealing means comprises gasket material between said interfering portions of said nozzle and said bore.

21. The combination of claim 15 wherein said mechanically sealing means comprises polished surfaces of said interfering portions of said nozzle and said bore and a mechanical engagement at least between said polished surfaces of said interfering portions of said nozzle and said bore sufficient to produce a seal therebetween.

22. The combination of claim 11 wherein said nozzle comprises a sleeve and a separate nozzle body, and wherein said mechanically attaching means comprises threads on said sleeve and threads in said bore, a flange on said nozzle body engaged by said sleeve threaded in said bore and interfering portions of said nozzle body and said bore which engage when said sleeve is tightened into said bore and mechanically attach said nozzle to said vessel and mechanically seal said nozzle in said bore.

23. The combination of claim 22 wherein said mechanically sealing means comprises polished surfaces of said interfering portions of said nozzle and said bore and a mechanical engagement at least between said polished surfaces of said interfering portions of said nozzle and said bore sufficient to produce a seal therebetween.

24. The combination of claim 22 wherein said mechanically sealing means comprises gasket material between said interfering portions of said nozzle and said bore.

25. The combination of claim 11 wherein said mechanically attaching means comprises threads on said nozzle and threads in said bore, and said nozzle and said bore include interfering portions which engage when said nozzle is tightened into said bore and mechanically attach said nozzle to said vessel and mechanically seal said nozzle in said bore.

26. The combination of claim 25 wherein said nozzle and said bore have circular cross sections, and a portion of said nozzle within said bore has a larger diameter than the largest diameter of said bore, thereby providing said interfering portions.

27. The combination of claim 26 wherein at least a portion of said bore and at least a portion of said nozzle are tapered.

28. The combination of claim 25 wherein said mechanically sealing means comprises gasket material between said interfering portions of said nozzle and said bore.

29. The combination of claim 25 wherein said mechanically sealing means comprises polished surfaces of said interfering portions of said nozzle and said bore and a mechanical engagement between said polished surfaces of said interfering portions of said nozzle and said bore sufficient to produce a seal therebetween.

30. The combination of claim 11 wherein said mechanically attaching means comprises a flange attached to or engaging said nozzle on the exterior of said vessel, and a plurality of bolts engaging said flange and said vessel for attaching said flange and said nozzle to said vessel.

31. The combination of claim 30 comprising means associated at least with said nozzle for engaging said vessel and preventing said nozzle from being drawn into the interior of said vessel.

32. The combination of claim 31 wherein said engaging means comprises interfering portions of said nozzle and said bore.

33. The combination of claim 32 wherein said nozzle and said bore have circular cross sections, and a portion of said nozzle within said bore has a larger diameter than the largest diameter of said bore thereby providing said interfering portions.

34. The combination of claim 33 wherein at least a portion of said bore and at least a portion of said nozzle are tapered.

35. The combination of claim 30 wherein said nozzle and said bore are cylindrical, and wherein said flange is attached to said nozzle, and wherein said mechanically sealing means comprises gasket material at least between said flange and the exterior of said vessel, said flange bearing tightly against said vessel through said gasket material.

36. The combination of claim 32 wherein said mechanically sealing means comprises at least one O-ring type gasket material between said nozzle and said bore.

37. The combination of claim 11 wherein said nozzle and said bore have circular cross sections of approximately the same diameter at corresponding locations thereof, and said mechanically attaching means comprises an interference fit between said nozzle and the interior of said bore along substantial portions thereof.

38. The combination of claim 37 wherein said nozzle and said bore are cylindrical.

39. The apparatus of claim 37 wherein said mechanically sealing means comprises said interference fit being sufficient to produce a seal between said nozzle and said bore.

40. The combination of claim 37 wherein said mechanically attaching means further comprises at least one flanged portion of said nozzle in an end of said nozzle within said vessel in engagement with the interior of said vessel adjacent said bore so as to prevent movement of said nozzle out of said bore to the exterior of said vessel.

41. The combination of claim 40 comprising a plurality of said flanged portions spaced radially apart relative to said bore in engagement with the interior of said vessel adjacent said bore.

42. A method for attaching a nozzle to a pipe in a nuclear power facility which has a bore therein through the circumference thereof comprising:

providing a nozzle having a first portion with a diameter therealong smaller than the diameter of the bore, a second portion with a diameter therealong larger than the diameter of the bore, and a flange therebetween;

inserting the nozzle portion with the smaller diameter into the bore with the flange bearing against the exterior circumference of the pipe;

attaching the flange to the pipe with a suitable clamping device; and mechanically sealing the exterior of the nozzle with respect to the pipe without a weld of the nozzle to the pipe.

43. The combination of a pipe in a nuclear power facility which has a bore therein through the circumference thereof and a nozzle, said nozzle having a first portion with a diameter therealong smaller than the diameter of said bore, a second portion with a diameter therealong larger than the diameter of said bore, and a flange therebetween, said smaller diameter nozzle portion passing through said bore, said larger diameter portion projecting from said bore and said flange bearing against the outer circumference of said pipe, a clamp device having a hole therein through which said nozzle larger diameter portion passes attaching said flange and with it said nozzle to said pipe, and means mechanically sealing the exterior of said nozzle with respect to said pipe without a weld of the nozzle to the pipe.

44. The combination of claim 43 wherein said sealing means comprises gasket material positioned between said flange and the outer circumference of the pipe.

45. The combination of a nozzle assembly and a pressure vessel of a nuclear power facility, said vessel having a bore, comprising:

a full nozzle extending from the interior of said vessel, through said bore and exiting said bore to the exterior of said vessel, threads on a portion of the nozzle projecting from said vessel, means associated at least with said nozzle which engages said vessel and prevents said nozzle from being withdrawn through said bore to the exterior of said vessel, and a nut threaded and tightened on said nozzle which bears against the exterior of said vessel and causes said means to firmly engage said vessel without a weld of said nozzle to said vessel; and means for mechanically sealing said nozzle to said vessel not including a weld of said nozzle to said vessel.

46. The combination of a nozzle assembly and a pressure vessel of a nuclear power facility which has a bore, comprising:

a full nozzle extending from the interior of said vessel, through said bore and exiting said bore to the exterior of said vessel, a flange attached to or engaging said full nozzle outside of said bore, bolts attaching said flange to the exterior of said vessel; and said full nozzle and said bore having interfering portions which engage when said flange is bolted to said vessel to provide mechanical attachment of said full nozzle to said vessel and also to produce a mechanical seal of said full nozzle and said bore at said interfering portions, said mechanical attachment and said mechanical seal not including a weld of said full nozzle to said vessel.

47. The combination of claim 46 comprising gasket material positioned between said engaging interfering portions of said nozzle and said bore.

48. The combination of a nozzle assembly and a pressure vessel of a nuclear power facility which has a bore, comprising:

a full nozzle extending from the interior of said vessel, through said bore and exiting said bore to the exterior of said vessel, a flange attached to or engaging said full nozzle outside of said bore, bolts attaching said flange to the exterior of said vessel adjacent the exterior of said vessel to provide a mechanical attachment of said nozzle to said vessel which does not include a weld of said nozzle to said vessel, and gasket material positioned between said flange and the exterior of said vessel which produces a mechanical seal of said nozzle with the exterior of said vessel which does not include a weld of said nozzle to said vessel.

49. The combination of a nozzle assembly and a pressure vessel of a nuclear power facility which has a bore, comprising:

a full nozzle extending from the interior of said vessel, through said bore and exiting said bore to the exterior of said vessel, threads on said nozzle and threads in said bore by which said nozzle is threaded to said bore, said nozzle and said bore including interfering portions which engage when said nozzle is tightened into said bore to provide a mechanical attachment of said nozzle to said vessel and a mechanical seal of said nozzle within said bore of the engaging interfering portions of said nozzle and said bore, said mechanical attachment and said mechanical seal not including a weld of said nozzle to said vessel.

50. The combination of claim 49 wherein said nozzle comprises a sleeve having said threads and a nozzle body which includes the portion interfering with a portion of said bore, a portion which passes through said sleeve and a shoulder portion which is engaged by said sleeve when said sleeve is tightened to said bore to cause said interfering portions to engage.

51. A method for installing a full nozzle to a pressure vessel of a nuclear power facility which has a bore, comprising:

providing a mechanical attachment of the full nozzle to the vessel passing through the bore in the vessel; and mechanically sealing the full nozzle with the vessel implemented either as part of the step of providing a mechanical attachment of the nozzle to the vessel or separately therefrom;

said mechanical attachment and said mechanical seal not including a weld of the nozzle to the vessel.

52. The combination of claim 46 wherein said nozzle is tapered for at least a portion of its length and said bore is correspondingly tapered for at least a portion of its length to provide said interfering portions which engage when said flange is bolted to said vessel.

53. In the combination of a full nozzle and a pressure vessel of a nuclear power facility which has a bore, said full nozzle extending from the interior of said vessel, through said bore and exiting said bore to the exterior of said vessel and being structurally attached to said vessel, the improvement comprising:

said full nozzle having a flange attached to or engaged with said full nozzle outside of said bore, bolts engaging said flange and threaded to the exterior of said vessel to attach said flange to said vessel.

54. The combination of claim 53 wherein said bolts engage said flange to compressively load said nozzle to said vessel, and provide a mechanical attachment of said nozzle to said vessel which does not include a weld of said nozzle to said vessel, a mechanical sealing of said nozzle to said vessel which does not include a weld of said nozzle to said vessel, or both.

55. In the combination of a full nozzle and a pressure vessel of a nuclear power facility which has a bore, extending from the interior of said vessel, through said bore and exiting said bore to the exterior of said vessel and being structurally attached to said vessel, the improvement comprising:

a flange attached to or engaging said full nozzle outside of said bore, bolts attaching said flange to the exterior of said vessel adjacent the exterior of said vessel, and gasket material positioned between said flange and the exterior of said vessel which provide a mechanical attachment of said nozzle to said vessel which does not include a weld of said nozzle to said vessel, a mechanical sealing of said nozzle to said vessel which does not include a weld of said nozzle to said vessel, or both.

56. The method of claim 9 herein configuring the replacement nozzle and the bore comprises providing polished surfaces thereof which when pressed together form said mechanical seal.

* * * * *